Patented Dec. 26, 1950

2,535,827

UNITED STATES PATENT OFFICE 2,535,827

PROCESS FOR DEPOLYMERIZING POLYMERS OF 1,1-DICYANO ETHYLENE

Alan E. Ardis and Harry Gilbert, Cuyahoga Falls, Ohio, assignors to The B. F. Goodrich Company, New York, N. Y., a corporation of New York No Drawing. Application March 4, 1949, Serial No. 79,713

5 Claims. (Cl. 260—465.8)

This invention relates to a process for depolymerizing polymers of 1,1-dicyano ethylene and pertains more particularly to the preparation of monomeric 1,1-dicyano ethylene by the thermal decomposition of the corresponding polymer.

In a copending application, Serial No. 11,336, filed February 26, 1948, methods for the preparation of novel polymers of 1,1-dicyano ethylene are disclosed. It is further disclosed therein that such polymers having a molecular weight in excess of 25,000 are extremely valuable in the preparation of spinning solutions from which can be spun colorless filaments and fibers possessing tensile strengths greatly in excess of the tensile strength possessed by fibers spun from other fiber-forming materials such as polyacrylonitrile and polyamides. Such polymers of 1,1-dicyano ethylene are also useful in the preparation of films and molded objects, preferably having one dimension of less than an inch.

In utilizing 1,1-dicyano ethylene polymers in the preparation of fibers and other materials, a certain amount of polymer is unavoidably wasted. Furthermore, as is stated in the copending application referred to hereinabove, 1,1-dicyano ethylene polymers possessing molecular weights below about 25,000 and especially those prepared in the presence of water, are of little or no utility because of an amber color and a tendency to degrade under various conditions. It is highly important from a commercial standpoint that the waste polymeric materials be economically converted to the more useful monomeric form.

Accordingly, it is an object of the present invention to provide a simple and economical means of converting the waste polymer to the corresponding monomer.

The above object is accomplished according to the present invention simply by pyrolyzing (thermally cracking) the polymer at a temperature in excess of its decomposition point and condensing and collecting the effluent vapors in a receiver. By this simple process it is possible to obtain monomeric 1,1-dicyano ethylene in excellent yield and in very pure form.

It is highly surprising that polymers of 1,1-dicyano ethylene will undergo thermal decomposition to give the monomer, since other vinyl and vinylidene polymers do not give their respective monomers by pyrolysis. For example, polyvinylidene chloride and polyvinyl chloride simply char on heating and give off hydrogen chloride gas while polyacrylonitrile also chars on heating with hydrogen cyanide gas being evolved.

It is even further surprising that it is possible to obtain very pure monomeric 1,1-dicyano ethylene merely by dry distilling the polymer, inasmuch as those polymeric materials which do thermally decompose to give the corresponding monomers will not ordinarily dry distill to give pure monomer but require an additional process step or steps in order that pure monomer may be obtained. For example, when polymethyl methacrylate is dry distilled, a crude monomer which is objectionably colored and of little or no commercial value is obtained, and only by additional fractional distillation, steam distillation or some other method can the pure methyl methacrylate be obtained.

In carrying out the unique pyrolysis process of this invention no special equipment is necessary. For example, one method consists simply in placing the polymeric 1,1-dicyano ethylene in a substantially dry flask (since the presence of water in the system tends to cause polymerization of the monomer as it forms, thereby decreasing the yield of the desired monomer), heating the flask to a temperature in excess of its decomposition point, whereupon monomer is evolved in the vapor form and condensing the vapors thus formed in a suitable receiver.

However, the highest yields of monomer are obtained by maintaining the flask and receiver at reduced pressure, for example, below 100 millimeters. It is further desirable in order that no appreciable polymerization of the monomer occurs in the receiver, that the receiver be cooled to temperatures of about 0° C. to —70° C. and/or that a polymerization inhibitor be present, although these are not critical expedients in themselves. Suitable inhibitors for this purpose include the oxides and sulfides of phosphorus and especially phosphorous pentoxide, certain phenolic materials such as picric acid, trinitrobenzene and pyrogallol, and the oxides of sulfur, especially sulfur dioxide. Alternatively, the monomer may be recovered by passing the vapors from the pyrolysis flask into a receiver containing liquid hydrocarbon such as toluene and the like, preferably cooled to a temperature of about 0° C. from which the monomer may be recovered by distillation or by further cooling of the toluene mixture to about —25° C. whereupon the monomer crystallizes and can be recovered by filtering.

The temperature at which the pyrolysis is conducted may be varied widely so long as it is maintained above the decomposition point of the polymer, it being understood that the decomposition temperature will vary slightly in proportion to the molecular weight of the polymer. In general, however, it may be stated that temperatures of from 150° C. to 300° C. or higher are desirably employed, with temperatures of from 170° C. to 250° C. being especially preferred for most 1,1-dicyano ethylene polymers. It has also been found that heat transfer within the pyrolysis flask is facilitated by the use of an inert heat transfer liquid such as tricresyl phosphate or the like.

The following specific examples are intended to illustrate more fully the thermal decomposition of polymers of 1,1-dicyano ethylene but are not to be construed as a limitation upon the scope of the invention. In the examples all parts are by weight.

*Example I*

Forty parts of polymers of 1,1-dicyano ethylene are placed in a dry distilling flask connected to a receiver, which contains a small amount of phosphorus pentoxide, the entire system being evacuated to 2 millimeters. The flask is heated in an oil bath to a temperature of 170° C. whereupon vapors of the monomer begin to distill into the receiver. The temperature is gradually raised to and maintained at 250° C. until distillation of the monomer ceases. Twenty-seven parts (68%) of very pure monomer (M. P. 8° C.) are obtained.

*Example II*

Ten parts of polymers of 1,1-dicyano ethylene and 20 parts of tricresyl phosphate are placed in a pyrolysis flask connected to a cooled receiver, and the system is evacuated to 2 millimeters. The flask is then heated in a metal bath to a temperature of 200° C. for 30 minutes and at 215° C. for an additional 90 minutes. Seven parts (70%) of monomeric 1,1-dicyano ethylene are recovered in the receiver. The monomer thus obtained polymerizes readily on heating in the presence of a polymerization catalyst.

*Example III*

Example II is repeated except that one part of phosphorus pentoxide is also placed in the pyrolysis flask. 6.5 parts (75%) of substantially pure monomeric 1,1-dicyano ethylene are obtained.

When the above examples are repeated at other temperatures in the range of 150° C. to 300° C., monomeric 1,1-dicyano ethylene is again obtained in excellent yields. Moreover, the pyrolysis may also be carried out at atmospheric pressure without appreciably affecting the yield obtained. Also, in any of the examples the process of depolymerization and polymerization may be repeated innumerable times without affecting the quality of the monomer.

Although specific examples of the invention have been herein described, it is not intended that the invention be limited solely thereto for numerous variations and modifications will be apparent to those skilled in the art and are included within the spirit and scope of the appended claims.

We claim:

1. A method of preparing monomeric 1,1-dicyano ethylene which comprises heating the corresponding polymer at a temperature in excess of its decomposition point whereupon vapors are evolved, and condensing said vapors.

2. A method of preparing monomeric 1,1-dicyano ethylene which comprises heating the corresponding polymer at a temperature in excess of its decomposition point, and at reduced pressure, whereupon vapors are evolved, and condensing said vapors.

3. A method of preparing monomeric 1,1-dicyano ethylene which comprises heating the corresponding polymer at a temperature in excess of its decomposition point whereupon vapors are evolved, and condensing said vapors in a receiver containing phosphorus pentoxide to inhibit polymerization of the monomer.

4. A method of preparing monomeric 1,1-dicyano ethylene which comprises heating the corresponding polymer at a temperature in excess of its decomposition point, and at a reduced pressure, whereupon vapors are evolved, and condensing said vapors in the presence of phosphorus pentoxide.

5. A method of preparing monomeric 1,1-dicyano ethylene which comprises heating the corresponding polymer at a temperature in excess of its decomposition point, in the presence of tricresyl phosphate, and at a pressure below 100 millimeters, whereupon vapors are evolved, and condensing said vapors in a receiver containing phosphorus pentoxide to inhibit the polymerization of the monomer.

ALAN E. ARDIS.
HARRY GILBERT.

REFERENCES CITED

The following references are of record in the file of this patent:

UNITED STATES PATENTS

| Number | Name | Date |
|---|---|---|
| 2,467,378 | Gilbert | Apr. 19, 1949 |
| 2,476,270 | Ardis | July 19, 1949 |

OTHER REFERENCES

MacArdle, Solvents in Synthetic Org. Chem. (Van Nostrand), pp. 1, 3 and 8.